June 27, 1933. W. NOWKA 1,915,797
SPEED REDUCER
Filed March 29, 1930  4 Sheets-Sheet 1

WERNER NOWKA,
INVENTOR.
BY
ATTORNEYS.

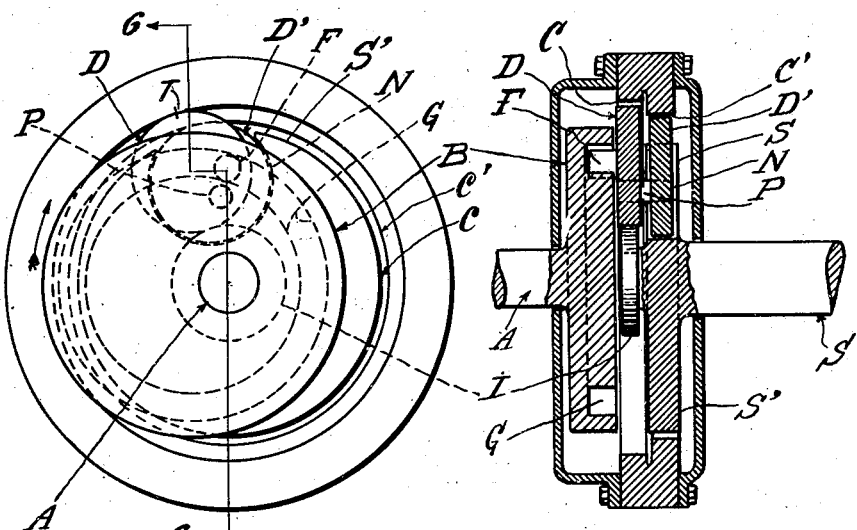
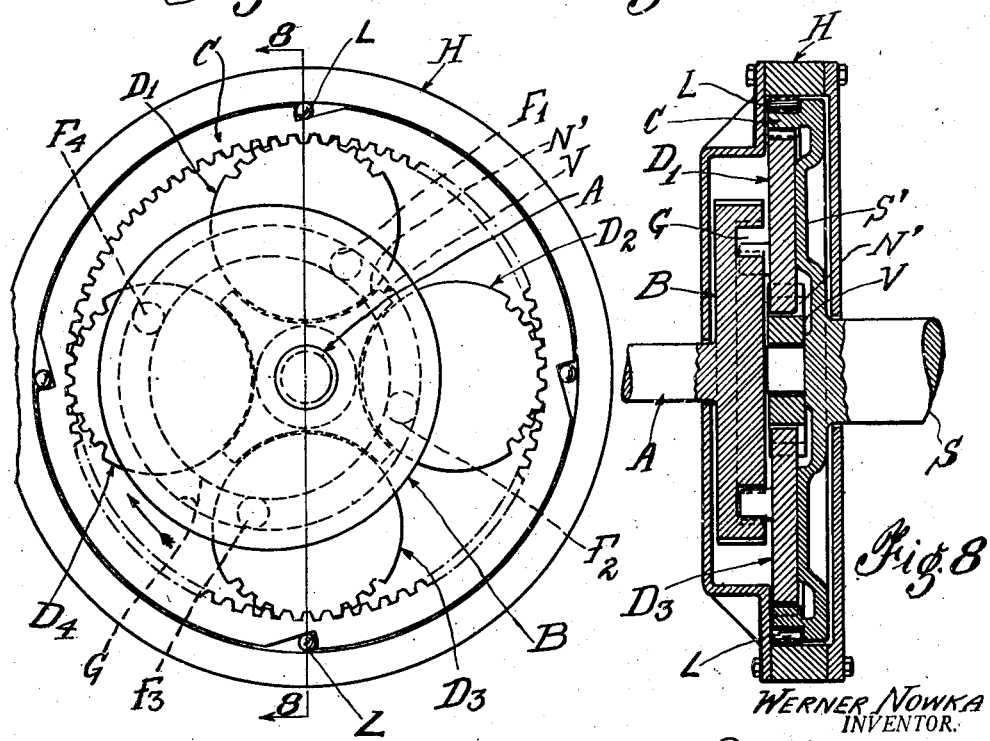

June 27, 1933.  W. NOWKA  1,915,797
SPEED REDUCER
Filed March 29, 1930   4 Sheets-Sheet 3

WERNER NOWKA
INVENTOR.
BY
ATTORNEYS.

June 27, 1933.  W. NOWKA  1,915,797
SPEED REDUCER
Filed March 29, 1930   4 Sheets-Sheet 4

WERNER NOWKA
INVENTOR.

BY Ralph Donath
Paul Pinchard
ATTORNEYS.

Patented June 27, 1933

1,915,797

UNITED STATES PATENT OFFICE

WERNER NOWKA, OF PITTSBURGH, PENNSYLVANIA

SPEED REDUCER

Application filed March 29, 1930. Serial No. 439,987.

This invention relates to power transmitting devices, and more in particular to variable speed reducers.

The object I have in view is the creation of a transmission based upon positive mechanical principles, by means of which the speed of a driven shaft may be controlled in the finest variations from zero to a maximum, while the drive-shaft remains in motion at constant speed.

The problem of speed control is an extremely important one to the industries, and many more or less successful solutions have been offered and are in use today. There are, for instance, several constructions on the market using hydraulic power; but they are of necessity relatively complicated and expensive, and at the same time limited in their application, since they can be used only for comparatively low pressures.

There are also a number of other constructions which operate with friction drives. But these are also more or less limited in their application inasmuch as friction contact cannot be considered mechanically positive, and besides, offer only a comparatively small range of speeds between certain limits, the lowest usually considerably more than zero.

While thereby a certain limited field of application is more or less satisfactorily served with the above mentioned types, the demand of the industries in general are not met until the following essential conditions are fulfilled:

1. The employment of positive mechanical principles which allow a construction of any size and for any load desired, according to the work to be performed, and therefore, permits of unlimited application.

2. A wide range of gradual speed variations with zero as the lower limit.

3. Easy, noiseless and positive control of speed.

4. Simple, relatively inexpensive and compact construction.

5. Minimum wear on the moving parts.

6. Constant connection and, therefore, the elimination of clutches or similar accessorial devices.

Besides these more general conditions, certain fields such as the automobile industry in particular, make some additional demands, the most important of which are:

7. All speed variations, preferably gradual, i. e. without steps, from zero up to the drive-speed of the engine.

8. Direct drive at engine speed.

All of these requirements, it is thought, are fulfilled in my invention, in which some well known principles are used in combination with new ones of my invention. These principles will be fully explained in the following description, considered in connection with the accompanying drawings forming part of this application, and in which:

Fig. 5 illustrates another gearless construction of my invention.

Fig. 6 is a sectional view taken along line 6—6 in Fig. 5.

Fig. 7 represents still another embodiment of my invention, in which gears are made use of.

Fig. 8 shows a section taken on line 8—8, Fig. 7.

Fig. 12 represents a section taken on line 12—12, in Fig. 11.

Fig. 13 is another sectional view along line 13—13, Fig. 11.

The basis of my variable speed transmission is variable eccentricity. Variable eccentricity is well known and has been used as the basis of several attempts at the construction of a variable speed transmission. Since, in most of these, the variable stroke of connecting rods mounted on such variable eccentric has been used, the necessary conversion of the reciprocating motion into a continuous direct motion has offered great handicaps, which, to the best of my knowledge, have failed to make these constructions practical, besides offering only a small range of variation.

My invention introduces, however, a new essential principle, i. e. that of using an eccentric mounted on a drive-shaft directly to operate levers as drive-members for the rotation of a second, or driven, shaft.

Figure 1:
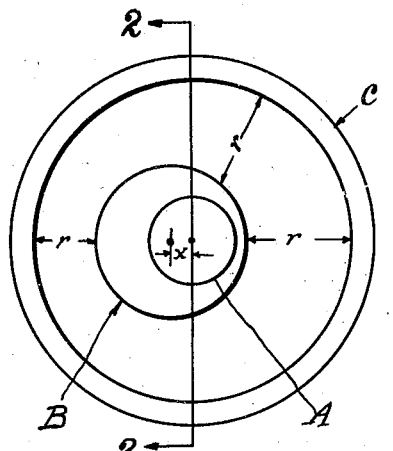
Fig. 1 is a diagrammatic view used to illustrate the fundamental principle upon which my invention is based.
Figure 2:
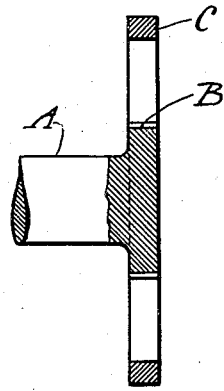
Fig. 2 is a cross section taken on line 2—2 in Fig. 1.

This principle is illustrated in Figs. 1 and 2: An eccentric B is mounted on a drive-shaft A in the center of an outer ring C. As B revolves with A at any given speed, the point of intersection of the arc of the eccentric and any radius of the ring C travels radially one full forward and backward stroke during each revolution of A; or, the distance "$r$" on any radius between the eccentric B and the inner surface of the outer ring C increases or decreases by an amount equal to twice the eccentricity of B.

This increase and decrease is utilized in forcing one, or more, floating members between the eccentric and the outer ring to move forward during each revolution of the drive-shaft, in one direction and by an amount governed by the eccentricity.

This principle established, many different constructions become possible as long as the floating members are so designed that one part of them is directly or indirectly connected with the eccentric and some other part directly or indirectly connected with the outer ring, so as to give the action caused by the eccentric a proper reaction which makes slippage impossible.

Figure 3:
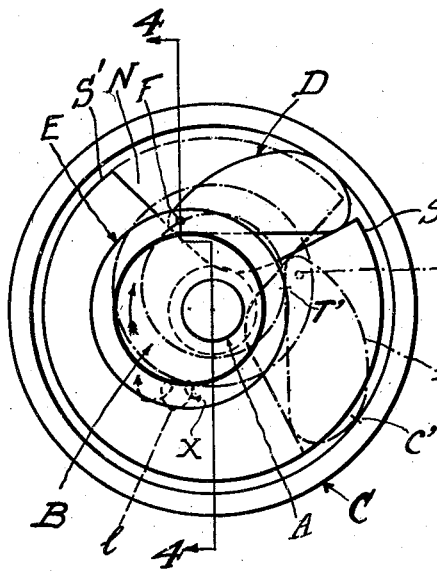
Fig. 3 represents a gearless embodiment of my invention.
Figure 4:
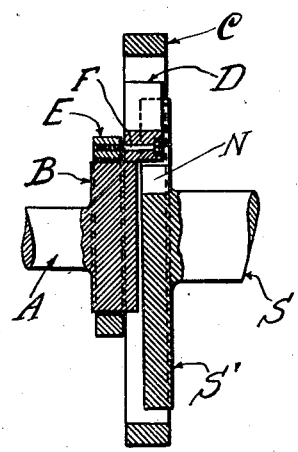
Fig. 4 is a cross section taken on line 4—4, Fig. 3.
Figures 14, 15:
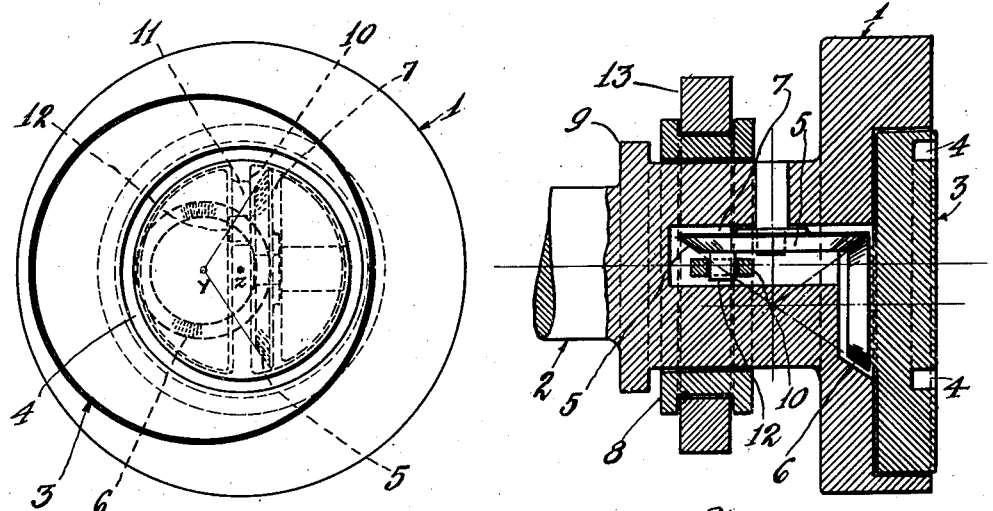
Fig. 14 shows a section taken on line 14—14 in Fig. 11, with the housing omitted.
Fig. 15 represents a fragmentary horizontal section taken axially of the device, substantially on line 15—15 in Fig. 11.

Figs. 3 and 4 show perhaps the simplest form of such a drive-member: The shaft A with the eccentric B revolves again inside of the outer stationary ring C in the clockwise direction indicated by the arrow. A suitably shaped drive-member D is now placed within the space between the eccentric B and the outer ring C, so that the outer curved portion of D touches the inner surface of the outer ring C, while the more straight, inner, portion of said drive-member is tangent to the eccentric B. A ring E is slidably mounted on the eccentric B in a plane parallel and independent of the drive-member D, but pivoted to said drive-member by means of a pin F.

If the ring E were not pivoted to the drive-member D, the friction between the eccentric B and said ring would tend to take the latter along with its rotation, moving it forward in such manner that a point X on the ring E would describe a curve as indicated by the dotted line with arrow 1.

However, on account of the ring E being pivoted to the properly shaped drive-member D, the frictional tendency of the ring E to rotate with the eccentric B becomes mechanically forced in a manner shown by the dot and dash lines, which represent a position of the arrangement further advanced. With the forward rotation of the drive-shaft and eccentric, the pivot point F connecting the ring E with the drive-member D has been forced radially outward to F', toward the outer ring C, while at the same time the eccentric B has forced the drive-member D outwardly to D' by its force exerted against the straight portion of the drive-member, to which it is tangent at T'. At the same time, the curved part of the drive-member touches the outer ring C at C', so that between the three points of contact F'—T'—C' no back slippage is possible, due especially to the pivot-pin F which causes the above mentioned forced mechanical motion.

This motion of E and D can now be utilized to force a second shaft to rotate forward by an amount governed by the throw of the drive-member D and, therefore, by the eccentricity of B.

One of the many ways to accomplish this is to set the drive-member D in a V-shaped cage or niche N provided in the concentric head S' of such a second shaft S and in a plane independent of, but parallel to, the eccentric B. This second shaft must now follow the motion of the drive-member D and is rotated as the "driven" shaft.

By introducing three or more such drive-members in similar cages N in the shaft-head S', the rotation of this second shaft becomes continuous, and its rotating speed is controlled by the eccentricity of B.

If then, the eccentricity of B is made variable, the speed at which the driven shaft rotates may also be made variable. That is, if B be moved to a position concentric with the drive-shaft A, no inward or outward motion of any tangential or pivotal points and, therefore, no forward rotation of the driven shaft is possible. It is only when B begins to move out of the center of A that such a rotation may be effected. The speed of the driven shaft may, therefore, be controlled from zero on upward to a maximum according to the eccentricity given to B.

In Fig. 1, the total difference between maximum "$r$" and minimum "$r$" equals twice the eccentricity. If this eccentricity be "$x$", then this total difference is $2x$, and the point of intersection of the eccentric and any radius on the outer ring C travels on this radius a distance of four times "x" during each revolution of the drive-shaft A, from the point nearest the center of A to the point farthest from that center, and back again.

If then, the maximum eccentricity "x" of B is so designed as to impart an angular forward rotation of 90 degrees to the driven shaft, during that quarter revolution of the drive-shaft in which the eccentric travels a radial distance of "x", then the angular rotation of the driven shaft during one entire revolution of the drive-shaft A is four times 90 degrees, or 360°. That is to say, that at such a maximum eccentricity the speed of the driven shaft equals that of the drive-shaft and a total variation of speeds from zero upward to the drive-speed has been effected.

Fig. 3 shows an eccentricity of such a maximum which creates a ninety degree motion. The pivot point F is here shown in the original position in full lines at a point radially half-way between its maximum and minimum distance from the center of the drive-shaft A. Rotation is shown clockwise. The second position is shown in dot and dash lines, after A with B has rotated one-quarter revolution, with a resulting angular motion of the cage N in the driven shaft S of ninety degrees.

While these principles offer many possibilities for construction, using different shapes for the drive-members, actuating these without the use of a ring about the eccentric, floating the outer ring, laying the drive-members to the inside of the eccentric, and other possible structural variations, this type of construction is not yet fully free from objectional features which at least in some lines of application would make its use less practical.

A gliding friction, for instance, between the drive-member and the reaction surface of C is unavoidable, even if careful detail design might reduce it to a minimum. In applications where such gliding friction is objectionable, constructions only slightly more complicated are preferable, wherein, however, some additional principles are involved.

Instead of drive-members which merely press against and glide along a reaction surface as above described, rocking or rolling drive-members are introduced, an example of which is illustrated in Figs. 5 and 6.

As shown therein, on a drive-shaft A, an eccentric B is again mounted as before. Other methods may be employed, but in this case the eccentric B is provided with a concentrically disposed groove G. In this groove is fitted an actuator-pin F protruding from the roller D, which latter now becomes the drive-member. The roller D is tangent to the inner surface of the outer ring C, which forms the reaction surface for the lever action of the drive-member, and also tangent to an inner ring I, freely mounted on the driven shaft S and which holds the drive-member at a constant distance from the drive-shaft.

It is evident that, as the drive-shaft A revolves, the actuator F is again forced toward the reaction surface of C and back again toward the center of the drive-shaft A by an amount depending upon the eccentricity of B and groove G. This motion tends to rotate the drive-member D, rolling along the reaction surface, forward in the outward direction of the actuator, and backward in its inward direction. Obviously, means must be provided to force this rotation and force it in one direction only. This may be accomplished in two general ways, both allowing considerable diversity in detail, i. e., with gears or without gears.

Figs. 5 and 6 illustrate a means of forcing this forward rolling of the drive-member without gears, by placing a second reaction surface C' in a plane behind and parallel to C, and a second drive-member D' in a plane behind D and in the same plane with C', which latter it touches. D' is eccentrically pivoted to D at a point P.

Now, as the actuator F is actuated by the eccentric and moved outward, and at the same time a resistance, such as that of the driven shaft, be offered to a forward rolling of D, the tendency of the actuator F would be to travel toward the point of tangence T. If this were allowed, no forward rolling of D would be effected and the latter would emptily slip back. However, with D' pivoted to D, the actuator F cannot travel toward T without forcing the pivotal point P outward in a direction parallel to its own, and since P actuates D' against a different reaction surface, D and D' spread apart and D' is forced to roll forward along C'. If D' is again placed in a cage N provided in the head S' of a second shaft S, this second shaft is thereby driven forward with D'.

If three or more sets of such drive-members are provided in their corresponding cages in the same shaft, the forward motion becomes continuous during the outward strokes, overlapping each other as the drive-shaft A revolves, and during the inward strokes, the drive-members D, D' return in an empty motion to their original positions.

Other constructions are possible, by giving the drive-members different shapes, etc., but much better is the employment of gears, again involving some additional principles, as illustrated in Figs. 7 and 8.

As shown therein, an eccentric B is again mounted on a drive-shaft A and provided with a circular groove G, concentric with B. In this groove are again fitted the actuators $F_1$, $F_2$, $F_3$ and $F_4$ of the drive-members $D_1$, $D_2$, $D_3$, and $D_4$, which in this case are each provided with gear-sectors meshing with the teeth of a geared outer floating ring C, which latter forms the reaction surface and freely floats within a stationary housing H. The rotation, however, is only possible in the clockwise direction of rotation of the eccentric, indicated by the arrow.

The forward, clockwise, direction of rotation of the floating reaction surface C may be forced by the action of the drive-members themselves, as explained hereafter, or by some locking arrangement, such as the ball or roller-lock L.

An uneven number of drive-members may be employed, but for the sake of clearness in the description, they are here shown arranged in pairs opposite each other. To show the action of the moving parts, the consideration of only one pair of opposite drive-members is necessary, since the other pair is always taken along while not in action.

If the eccentric revolves in the direction indicated, $F_1$ is forced outward toward the floating-ring. At the same time $F_3$ is forced inward toward the center of rotation. $F_3$, therefore, actuates $D_3$ inwardly with a resulting forward, clockwise, rotation of the floating reaction surface C. $F_1$ tends to rotate the same reaction surface counterclockwise, but is prohibited from doing this by the action of $D_3$, as well as the locking arrangement L. $F_1$ is free to roll off along C in a forward direction, until the directions of $F_1$ and $F_3$ turns and $F_1$ moves C forward while $F_3$ rolls off, also forward on C.

A second shaft S may be driven by this arrangement by connecting it either directly or indirectly to the floating reaction surface. In the illustrated embodiment, the reaction surface is directly connected to the driven shaft by means of a flange S′ welded or otherwise secured to the second shaft. The drive-members are slidably guided in recesses N′ provided in a spider V rotatably mounted on the end of the second shaft.

Figures 9, 10:
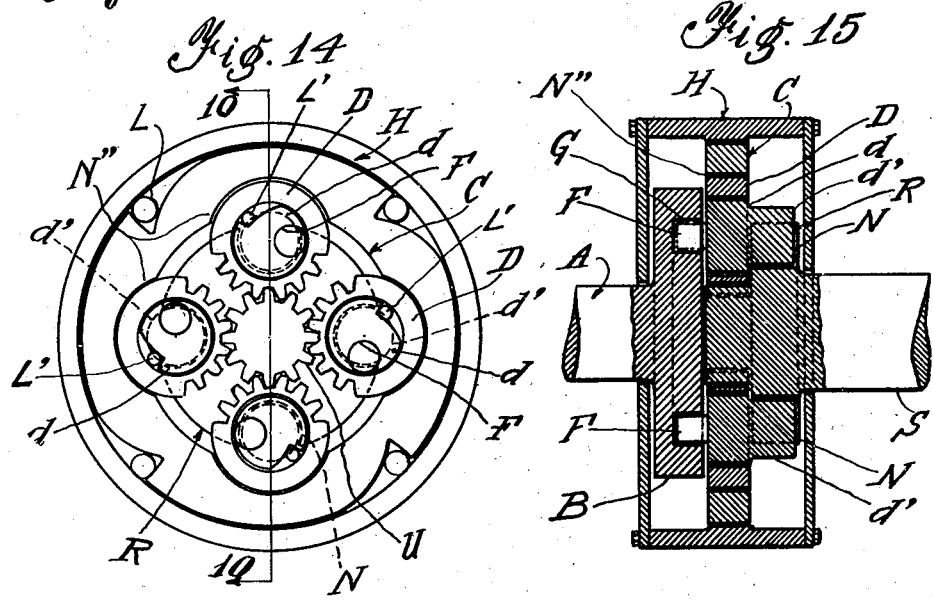
Fig. 9 is a fragmentary front elevation of another modification of this invention, also provided with gears.
Fig. 10 is a cross-sectional view taken on line 10—10, Fig. 9.
Figure 11:
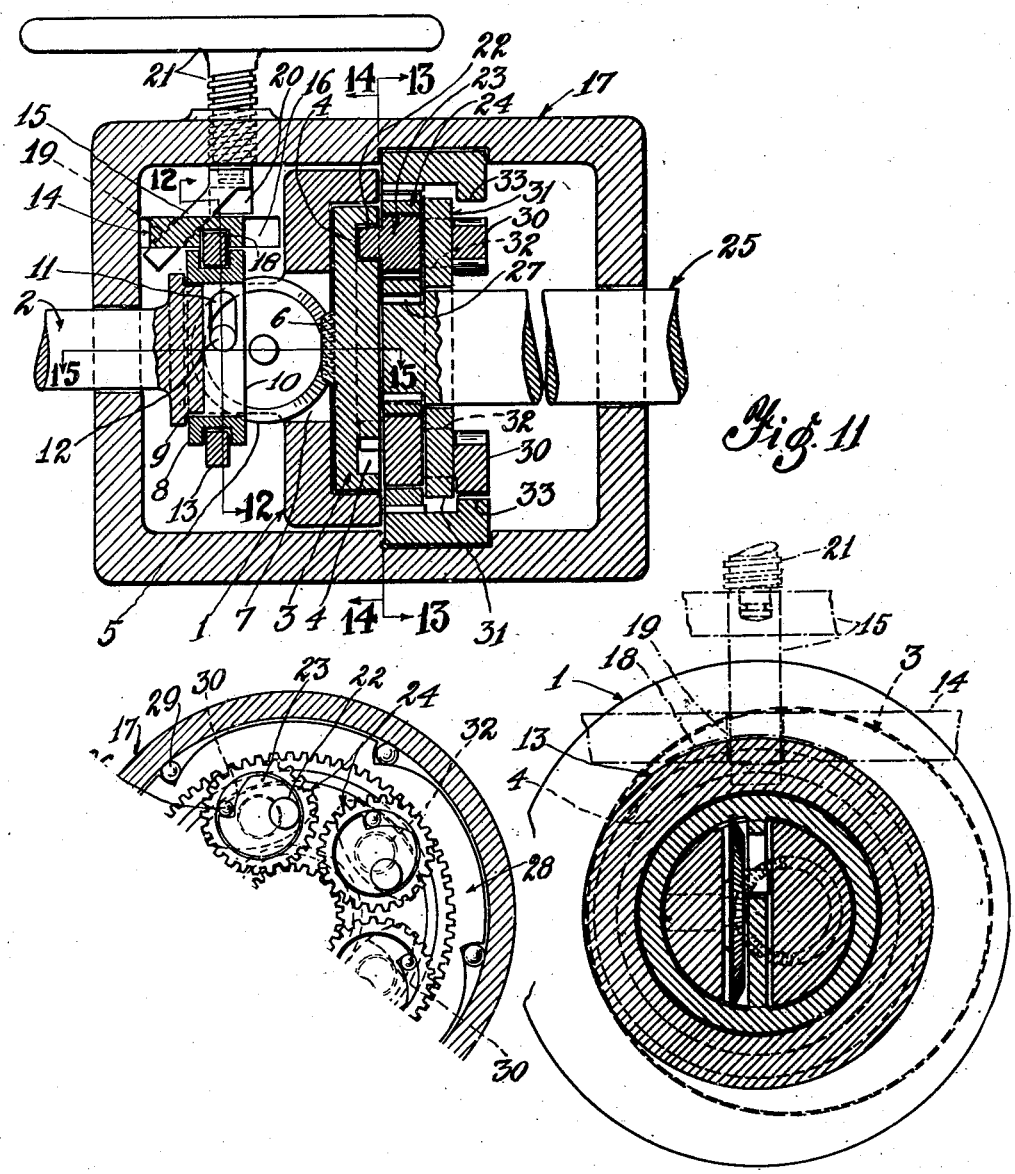
Fig. 11 is a sectional view through another modified construction of a geared speed reducer, provided with one of many available types of mechanisms for varying the ratio of speed reduction of the device.

The arrangement of the principal moving parts may (and perhaps to greater advantage on account of the greater speed imparted to the driven shaft) also be reversed, as shown in Figs. 9 and 10.

In this construction each drive-member consists of a ring D, the inner portion of which is partly toothed and the outer portion of which is smooth. This ring is rotatably mounted on a core "$d$" in which is provided a roller or ball-lock L′, by means of which D and "$d$" may be locked into a unit. On one side of the core is an actuator-pin F which fits within the groove G of the eccentric B and on the other side is centrally located the stub-shaft "$d'''$".

The inner toothed portion of each drive-member meshes with the gear U of a ring or disc R which is rigidly mounted on the second or driven shaft S. In the disc R are also provided the cages or niches N in which are rotatably mounted the stub-shafts "$d'''$" of the drive-members. The outer ring C is here gearless, so as to allow the free sliding rotation of the untoothed parts of the drive-members in the cages N″, but still forms the reaction surface and must be locked with suitable means, such as indicated at L, which will permit only of a forward rotation of C within the stationary housing H.

The action is exactly the same as before described, but reversed, so that the inner disc R is rotated forward, and the rotation is forced during the outward stroke of the eccentric, with one very important addition, to wit:

The drive-member D rotates the gear U forward. However, gear U is connected directly to the driven shaft S, which is thus rotated with said gear. If the drive-member D is now mounted in a cage on the same drive shaft S, then a double motion is effected which greatly increases the speed of the driven shaft, and even allows of a design in which the speed of the driven shaft equals that of the drive-shaft, similar to the effect given in the described embodiment shown in Figs. 3 and 4.

For, as D rotates U and thereby S, the very angular motion of S in turn moves its own source of rotation, i. e. the drive-member D, forward a corresponding angular distance. The shaft S, therefore, rotates during one outward stroke of the eccentric the distance it is being moved by the drive-member D about the center of D, plus the distance this same center of D travels forward in angular rotation about the center of the drive-shaft and driven shaft.

The foregoing general principles with some additional ones, which will become apparent in the following detailed description, are now embodied in the design of a transmission which meets all of the requirements cited at the beginning of this specification.

There are many different types of devices on the market today by means of which the eccentricity of a cam mounted on a drive-shaft may be varied while the shaft is in motion.

In connection with the present application, however, wherein the rotating speed of a second shaft depends upon such an eccentricity with all its variations, it becomes necessary to eliminate a very objectional feature which is more or less common to the methods now in use, the fact, namely, that an eccentric mounted on a drive-shaft develops great centrifugal forces, especially at high speeds, which cause so considerable vibrations that the use of variable eccentricity for driving a second shaft would be impractical, unless means be found to overcome this objection.

A method for shifting the eccentricity has been devised by myself, particularly suited for a transmission, such as the one under consideration.

Referring to Figs. 11 to 15, a flange-disc 1 is mounted rigidly and concentrically on a drive-shaft 2. Eccentrically in disc 1 and with a center "$y$" is mounted another disc 3 closely fitting, but freely revolving, in a recess provided in the flange-disc 1. This slidably mounted disc 3 is now provided with a circular groove 4, whose center "$z$", in its original position, is concentric with the drive-shaft. As disc 3 revolves about its center "$y$", however, the groove 4 revolves with it and its center "$z$" describes a circle with the radius "$z$—$y$" about "$y$" and thereby moves out of the concentric position with reference to the drive-shaft.

To control the rotation of disc 3, several methods may be employed. Shown here is a pair of bevel-gears 5 and 6 placed in a properly located slot 7 in the drive-shaft and the flange-disc 1. A collar 8, freely rotating with the drive-shaft 2, is slidably mounted on the latter, so that it may move axially forward and backward between limits, such as the flange-disc 1 at one extreme and some convenient shoulder 9 at the other extreme. An arm 10 provided with a slot 11 extends through the hollow of the collar 8 and is placed within the slot 7 in the drive-shaft. A pin 12 projects out from the bevel-gear 5 and fits in the slot 11. An outer ring 13 is fitted in a circumferential groove in the collar 8 and may in turn be actuated by an arrangement of slides 14 and 15.

The horizontal slide-bar 14 slides in horizontal supports or slots 16 provided at both sides of the stationary housing 17 and has a curved groove 18 slidably engaged by the ring 13. The oblique slide 15 engages an inclined aperture 19 provided in the slide-bar 14 and is guided for vertical sliding movement by grooves 20, also in the side-walls of the housing.

The two slide-bars 14, 15 are actuated by a screw 21 swivelly connected to the slide-bar 15 and placed in the top of the housing 17, so that the position of the collar 8 may be easily controlled from the outside. It will be noted (Fig. 11) that when the slide-bar 15 is forced down, the collar 8 will be shifted axially to the right, whereby the pin 12 will cause a clockwise rotation of the bevel-gear 5, which, in turn, will rotate the eccenter 3 and the groove 4 into the desired position.

By this construction, the position of the circular groove 4 in the eccentric disc 3 may be gradually shifted from a concentric to an eccentric position relative to the drive-shaft 2, without practically disturbing the weight distribution, when this groove becomes eccentric.

In the groove 4 are now fitted the actuators 22 of the cores 23 which latter, together with the outer gears 24 in which they are placed, form the drive-members.

From Fig. 13, in particular, it will be seen that there can be no motion of the actuators 22 as long as the groove 4 runs concentric with the drive-shaft 2 and also the second, or driven, shaft 25, the two shafts being in alinement. But, as groove 4 becomes eccentric with reference to the shafts, these actuators are forced outward and inward in succession by an amount equal to the eccentricity, and the total travel of each during one revolution of the drive-shaft, and therefore of the eccentric groove 4 is four times the eccentricity.

As each actuator 22 moves outward, it rotates its corresponding core 23 in an anti-clockwise direction. In this direction, it locks its corresponding gear 24 by means of a convenient locking device, such as 26, which unlocks when the core 23 is actuated in the opposite, clockwise, direction by its actuator, thus freely allowing it to return while the gear 24 is still being rotated in anticlockwise direction, due to its meshing engagement with the gear 27 of the second, or driven, shaft 25. As shown, the gear 24 meshes with the outer reaction ring 28, as well as with said gear 27.

The core 23 and its gear 24 being thus locked into a unit, force the gear 24 to rotate along the reaction ring 28 a distance corresponding to the movement of the actuator 22 and depending upon the pitch diameters of the gears 24 and 28 and, at the same time, this gear 24 forces the gear 27 of the driven shaft, and thereby the shaft itself, to rotate forward in a clockwise sense.

By properly proportioning the dimensions of the various moving parts, the speed of the driven shaft, at maximum eccentricity may be made equal to that of the drive-shaft.

Thus, if the pitch diameter of the gear 24 is so proportioned to that of gear 27 on the driven shaft that a rotation of the gear 24 due to a corresponding maximum eccentricity of the groove 4 will cause the driven shaft to rotate 70 degrees, and at the same time the center of the gear 24 travels forward an arcuate distance of 20 degrees, then the driven shaft 25 will be rotated a total amount of 70 plus 20 degrees, i. e. 90 degrees forward, during the time the actuator 22 has moved outward from a central position to its extreme position, which time is equivalent to one quarter revolution of the drive-shaft 2 and the eccentric groove 4. In one full revolution of the drive-shaft, therefore, the driven shaft 25 is rotated four times 90 degrees, or 360 degrees, or, the speed of the driven shaft equals that of the drive-shaft. Hence, all variations of speed of the driven shaft 25 between zero at the minimum eccentricity (zero) and the drive-speed at the maximum eccentricity are attained.

The reaction ring 28 remains stationary during the entire gamut of speed variations. However, it is placed in the stationary housing 17 independently and held in stationary position by locking devices, such as indicated by numeral 29, so that the reaction ring may be released and rotate forward at any time such rotation becomes desirable.

This occurs at the time when a maximum speed of the driven shaft equal to the drive-speed is reached. Another locking arrangement, such as the substantially elliptical cams 30, may now be attached to the drive-member or the eccentric, preferably to the cores 23, as shown, either within the bearing ring 31 in which these drive-members are mounted by means of stub-shafts 32, or behind this bearing ring 31, in an independent plane, as shown. At maximum eccentricity the locking cams 30 grip the outer reaction ring 33, with the result that all moving parts lock together and the drive-shaft and driven shaft become one.

In the above described device, the driven shaft rotates always in the same direction. Where reversible power transmission is required, such as in automobiles and other self-propelled vehicles, etc., the driven shaft may be connected to any type of many suitable reversing devices now available in the trade, in a manner that will be readily apparent to those versed in this art.

While I have described in the foregoing several embodiments of speed reducers, all based on the use of variable eccentrics directly mounted on a drive-shaft and a method for effecting variable eccentricity without disturbing the weight distribution of the ec-center, it will be understood, as suggested repeatedly herein, that there may be made various changes in the construction and arrangement of the details of this invention without departing from the field and scope of the same, and I intend to include in this application all such variations as fall within the sphere of the appended claims.

I claim:

1. In a speed reducer, a drive-shaft; a driven shaft; an eccentric mounted on the drive shaft; a reaction member concentric with the drive-shaft; a drive-member actuated by the eccentric and in continuous engagement with said reaction member and the driven shaft, a socketed head on the driven shaft engaged by said drive member directly rotated by the eccentric to actuate the driven shaft by said drive-member.

2. In a speed reducer, a drive-shaft and a driven shaft coaxially disposed; an eccentric mounted on the drive-shaft; a reaction member concentric to said drive-shaft and driven shaft; a drive member actuated by the eccentric and continuously bearing on said reaction member; and means embodying a socketed head on the driven shaft engaged by said drive member to actuate the driven shaft by said drive member.

3. In a speed reducer, a drive-shaft and a driven shaft coaxially disposed; an eccentric movably mounted on the drive-shaft; means to vary the eccentricity of said eccentric; a reaction member concentric to said drive-shaft and driven shaft; drive-members actuated by the eccentric and in continuous engagement with the reaction member, and means embodying a socketed abutment on the driven shaft providing a contra-reaction bearing to actuate the driven shaft by said drive-member.

4. In a speed reducer, a drive-shaft and a driven shaft coaxially disposed; an eccentric rotatably mounted on the drive-shaft; means to rotate the eccentric to vary the eccentricity thereof; a reaction member concentric to said drive-shaft and driven shaft; drive-members actuated by the eccentric and in continuous engagement with the reaction member, and means embodying a socketed abutment on the driven shaft to actuate the driven shaft by said drive-member.

5. In a speed reducer, a drive-shaft and a driven shaft coaxially disposed; a flange-disc mounted on the drive-shaft; an eccentric-disc mounted eccentrically in the flange-disc and rotatable therein; said eccentric-disc having a groove normally concentric with the drive-shaft; a geared reaction member concentric with the drive-shaft; a plurality of planetary gears meshing with the reaction member; an actuator on each planetary gear in engagement with said groove and actuated thereby conjunctively with its planetary gear, and a central gear positioned on the driven shaft and in mesh with said planetary gears whereby said driven shaft may be rotated.

6. In a speed reducer, a drive-shaft and a driven shaft co-axially disposed; a flange-disc mounted on the drive-shaft; an eccentric disc mounted eccentrically in the flange-disc and rotatable therein, said eccentric disc having a groove normally concentric with the drive-shaft; a geared reaction member concentric with the drive-shaft; a plurality of planetary gears meshing with the reaction member; an actuator on each planetary gear in engagement with said groove and actuated thereby conjunctively with its planetary gear; a central gear positioned on the driven shaft and in mesh with said planetary gears whereby said shaft may be rotated, and means to rotate said eccentric-disc to vary the eccentricity of said groove relative to the drive-shaft.

7. In a speed reducer, a drive-shaft and a driven shaft co-axially disposed; a flange-disc mounted on the drive-shaft; an eccentric-disc mounted eccentrically in the flange-disc and rotatable therein, said eccentric-disc having a groove normally concentric with the drive-shaft; a stationary housing; a geared reaction member rotatably mounted in the housing and concentric with the drive-shaft; a plurality of planetary gears meshing with the reaction member; a core for each planetary gear to rotatably support same; means to lock said cores and planetary gears for rotation as a unit in one direction; an actuator rigidly mounted on each core in engagement with said groove and actuated thereby; a central gear positioned on the driven shaft and in mesh with said planetary gears whereby said shaft may be driven; means to rotate the eccentric-disc to vary the eccentricity of said groove relative to the drive-shaft, and locking means to lock the reaction member in the housing against rotation in one direction only.

8. In a speed reducer, a drive-shaft and a driven shaft coaxially disposed; a flange-disc mounted on the drive-shaft; an eccentric-disc mounted eccentrically in the flange-disc and rotatable therein, said eccentric-disc having a groove normally concentric with the drive-shaft; a stationary housing; a geared reaction member rotatably mounted in the housing and concentric with the drive-shaft; a plurality of planetary gears meshing with the reaction member; a core for each planetary gear to rotatably support same; a common supporting ring for the cores of the planetary gears; means to lock said cores and planetary gears for rotation as a unit in one direction; an actuator rigidly mounted on each core in engagement with said groove and actuated thereby; a central gear positioned on the driven shaft and in mesh with said planetary gears whereby said shaft may be driven; means to rotate the eccentric disc to vary the eccentricity of said groove relative to the drive-shaft, and locking means to lock the reaction member in the housing against rotation in one direction only.

9. In a speed reducer, a drive-shaft and a driven shaft co-axially disposed; a flange-disc mounted on the drive-shaft; an eccentric-disc mounted eccentrically in the flange-disc and rotatable therein, said eccentric-disc having a groove normally concentric with the drive-shaft; a stationary housing; a geared reaction member rotatably mounted in the housing and concentric with the drive-shaft; a smooth reaction member formed integrally with the geared reaction member and concentric therewith; a plurality of planetary gears meshing with the reaction member; a core for each planetary gear to rotatably support same; means to lock said cores and planetary gears for rotation as a unit in one direction; an actuator rigidly mounted on each core in engagement with said groove and actuated thereby; a central gear positioned on the driven shaft and in mesh with said planetary gears whereby said shaft may be driven; means to rotate the eccentric-disc to vary the eccentricity of said groove relative to the drive-shaft; locking means to lock the reaction-member in the housing against rotation in one direction only, and additional locking means mounted on and actuated by each core and effective on said smooth reaction-member.

10. In a speed reducer, in combination with a drive shaft and a driven shaft, and an annular intervening reaction member; an eccentric on the drive shaft, a socketed abutment on the driven shaft, and a motion transmitting member actuated by the eccentric adapted to continuously engage the reaction member and the socketed abutment of the driven shaft.

11. In a speed reducer, in combination with a drive shaft and a driven shaft, and an annular intervening reaction member having an inner face concentric with the drive shaft; an eccentric on the drive shaft, a rotating head on the driven shaft having a socketed abutment, and a motion transmitting member actuated by the eccentric of the drive shaft having a portion adapted to continuously engage and bind against the inner face of the reaction member and a portion adapted to engage the abutment of the driven shaft to effect rotation thereof.

12. In a speed reducer, in combination with a drive shaft and a driven shaft, and an annular intervening reaction member; an eccentric on the drive shaft, a socketed abutment on the driven shaft, and means intervening between the eccentric and the abutment of the driven shaft adapted to effect continuous engagement with the reaction member and said abutment to transmit movement thereto from the drive shaft.

In testimony whereof I affix my signature.

WERNER NOWKA.